United States Patent
Steinberg et al.

(10) Patent No.: US 6,817,153 B2
(45) Date of Patent: Nov. 16, 2004

(54) CORNERBOARD ASSEMBLY

(76) Inventors: Robert Steinberg, 1141 Liberty Bell Dr., Cherry Hill, NJ (US) 08003; Kenneth S. Bernstein, 33 Totten Dr., Bridgewater, NJ (US) 08807; Claudio O. Lagar, 3 DC Febero 1658-, Buenos Aires (AR); Jose R. Martos, Placibo Harin 1584, Boulogne- Buenos Aires (AR)

( * ) Notice: Subject to any disclaimer, the term of this patent is extended or adjusted under 35 U.S.C. 154(b) by 0 days.

(21) Appl. No.: 10/270,411

(22) Filed: Oct. 2, 2002

(65) Prior Publication Data

US 2004/0065031 A1 Apr. 8, 2004

(51) Int. Cl.$^7$ .............................. E04B 2/08; E04B 2/18; E04B 2/32; E04B 2/46
(52) U.S. Cl. .................... 52/592.1; 52/287.1; 52/288.1; 52/591.4; 52/281; 403/401; 403/403; 403/295; 403/231; 403/402
(58) Field of Search ................................. 403/231, 382, 403/401, 403, 402, 295, 340, 381, 339; 52/287.1, 592.1, 288.1, 591.4, 272, 281; 40/339

(56) References Cited

U.S. PATENT DOCUMENTS

| | | | | |
|---|---|---|---|---|
| 1,533,099 A | * | 4/1925 | Carroll | 403/231 |
| 4,227,336 A | * | 10/1980 | Misterka | 446/87 |
| 4,416,097 A | * | 11/1983 | Weir | 52/220.2 |
| 4,428,408 A | * | 1/1984 | Grisley | 144/144.51 |
| 4,741,144 A | * | 5/1988 | Graffin | 52/724.5 |
| 5,114,265 A | * | 5/1992 | Grisley | 403/381 |
| 5,588,726 A | * | 12/1996 | Lee | 312/263 |
| 6,283,668 B1 | * | 9/2001 | Norek | 403/231 |
| 6,357,194 B1 | * | 3/2002 | Jones, Jr. | 52/590.1 |
| 6,519,912 B1 | * | 2/2003 | Eckmann et al. | 52/730.7 |
| 6,526,712 B2 | * | 3/2003 | Brooks et al. | 52/287.1 |
| 6,584,747 B2 | * | 7/2003 | Kettler et al. | 52/592.2 |

* cited by examiner

Primary Examiner—Carl D. Friedman
Assistant Examiner—Nahid Amiri
(74) Attorney, Agent, or Firm—Stuart M. Goldstein

(57) ABSTRACT

A cornerboard assembly comprises an interlocking, opposite direction joint between cornerboard millwork components. Dual male members extend from the end of one of the respective components, forming an opening between the members. The male members and opening formed between the members have planar outer surfaces. The second component comprises an end with a single male member which is configured to be inserted into the opening of the first component. The male member of the second component and the other surfaces at this end also have planar outer surfaces. The planar outer surfaces of the two cornerboards components are configured to be positioned adjacent to each other, in surface to surface contact. An exterior construction glue or similar adhesive is placed on the planar surfaces to fixedly and permanently secure the components.

4 Claims, 2 Drawing Sheets

CORNERBOARD ASSEMBLY

BACKGROUND OF THE INVENTION

Cornerboards have long been used to support and dress-up the sides and corners of exterior walls of houses, buildings, and similar structures. Such millwork products generally consist of component pieces which are placed over the edges and corners of exterior walls, routinely with two component pieces which form a right angle corner or by use of a one piece, right angled, extruded component overlaying the wall at its corner.

More specifically, cornerboards of wood construction usually employ two separate cornerboard component pieces which are positioned along the edge of and against the exterior corner of a wall. The component pieces each have flat end surfaces which are placed in adjacent contact. The component pieces are then secured to the wall in this position, usually by nailing. Such two piece component construction however, has several significant disadvantages. Since pieces are often times not milled precisely, when they are positioned end-to-end, there inevitably will be some space between the pieces, even after they are secured to the wall. This is unsightly and, over time, the spacing may increase, inviting damage to the pieces. Weather may further affect the corner connection, resulting in further separation and unevenness of the component pieces or cracking of the pieces at this location. Two piece cornerboard installation is also a cumbersome task. The pieces must be squarely positioned against the wall surface and maintained in that position, in order that they may be properly aligned and secured in position.

While synthetic materials, such as vinyl and certain construction plastics, can be extruded to form one piece cornerboard elements, as a practical matter, the use of one piece sections is restricted to this type of material. Wood, which is a most favored material for cornerboard construction, can not practically and economically be manufactured as a single cornerboard piece, so is rarely used in this form. However, wood millwork is generally more economical to manufacture and provides the greatest variety of design at reasonable cost. A means to effectively and economically provide an integral wood cornerboard assembly has, heretofore, not been developed.

SUMMARY OF THE INVENTION

It is thus an object of the present invention to provide a cornerboard assembly which overcomes the disadvantages and limitations of prior cornerboard construction.

It is an object of the present invention to provide a cornerboard assembly which provides for a joint connection capable of securely attaching cornerboard millwork components to form an integral, solid and stable, single piece cornerboard.

It is another object of the present invention to provide a cornerboard assembly which uses wood as its fabricated material, but still ensures a secure and solid connection of cornerboard millwork components to form a single piece cornerboard.

It is a further object of the present invention to provide a cornerboard assembly which employs a unique interlocking joint to secure cornerboard millwork components.

It is still another object of the present invention to provide a cornerboard assembly which provides an interlocking joint connection which securely maintains an integrally assembled cornerboard for ease of proper alignment and installation on wall surfaces.

It is a further object of the present invention to provide a cornerboard assembly which provides an integral, piece cornerboard which is economical to manufacture and easy to assemble.

It is still a further object of the present invention to provide a cornerboard assembly which is durable after installation, and maintains its aesthetic appearance over time, despite the weather elements.

It is another object of the present invention to provide a cornerboard assembly which can readily and economically be customized, according to size, shape, and design, for ease of manufacture, delivery, and on-site installation.

The objects of the invention are accomplished by a cornerboard assembly comprising an interlocking, opposite direction joint between cornerboard millwork components. Dual male members extend from the end of one of the respective components, forming an opening between the members. The male members and opening formed between the members have planar outer surfaces. The second component comprises an end with a single male member which is configured to be inserted into the opening of the first component. The male member of the second component and the other surfaces at this end also have planar outer surfaces. The planar outer surfaces of the two cornerboards components are configured to be positioned adjacent to each other, in surface to surface contact. An exterior construction glue or similar adhesive is placed on the planar surfaces to fixedly and permanently secure the components.

The result is an integral, single piece, cornerboard assembly which can be economically and easily produced and which may be fabricated of wood components. The bond formed by the interlocking surfaces at the ends of the millwork components creates a solid and secure single cornerboard element which is easy to install, more aesthetically pleasing, and will better withstand weather conditions and result in a longer life.

The novel features which are considered as characteristic of the invention are set forth in particular in the appended claims. However, both as to their design, construction, and use, together with additional features and advantages thereof, they are best understood upon review of the following detailed description with reference to the accompanying drawings.

DETAILED DESCRIPTION OF THE INVENTION

Figure 1:
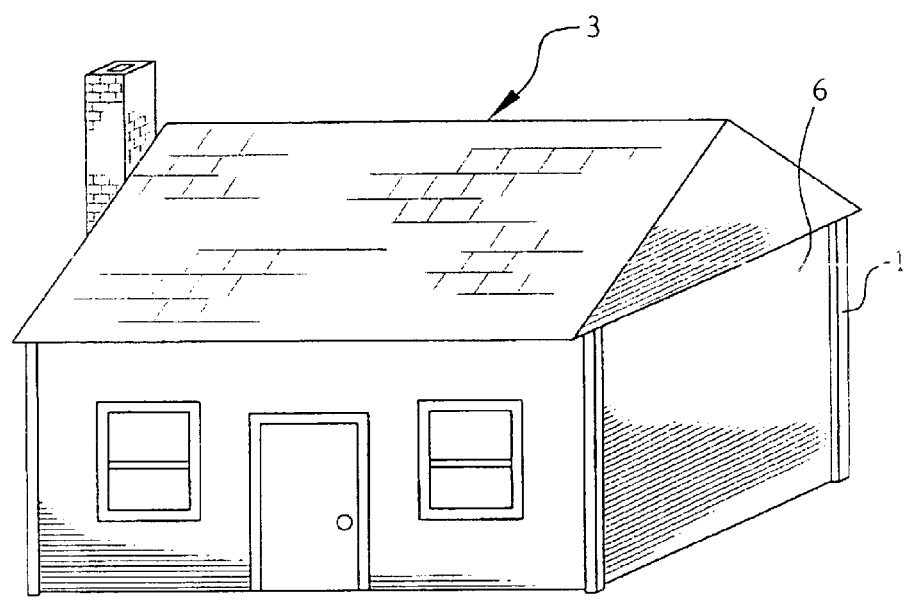
FIG. 1 is a view of the cornerboard assembly of the present invention as it is to be installed on exterior walls.

Cornerboard 1 of the present invention is designed to be secured to the outer surface of exterior walls 6 of, for example, a building or house 3, such as seen in FIG. 1.

Figure 2:
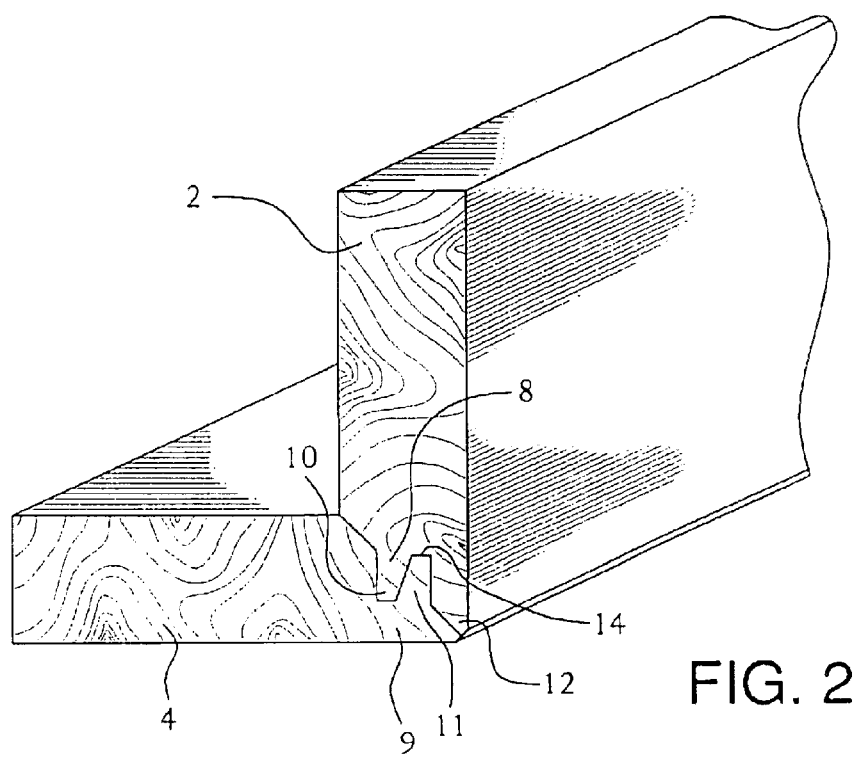
FIG. 2 is a perspective view of the cornerboard assembly of the present invention.
Figure 3:
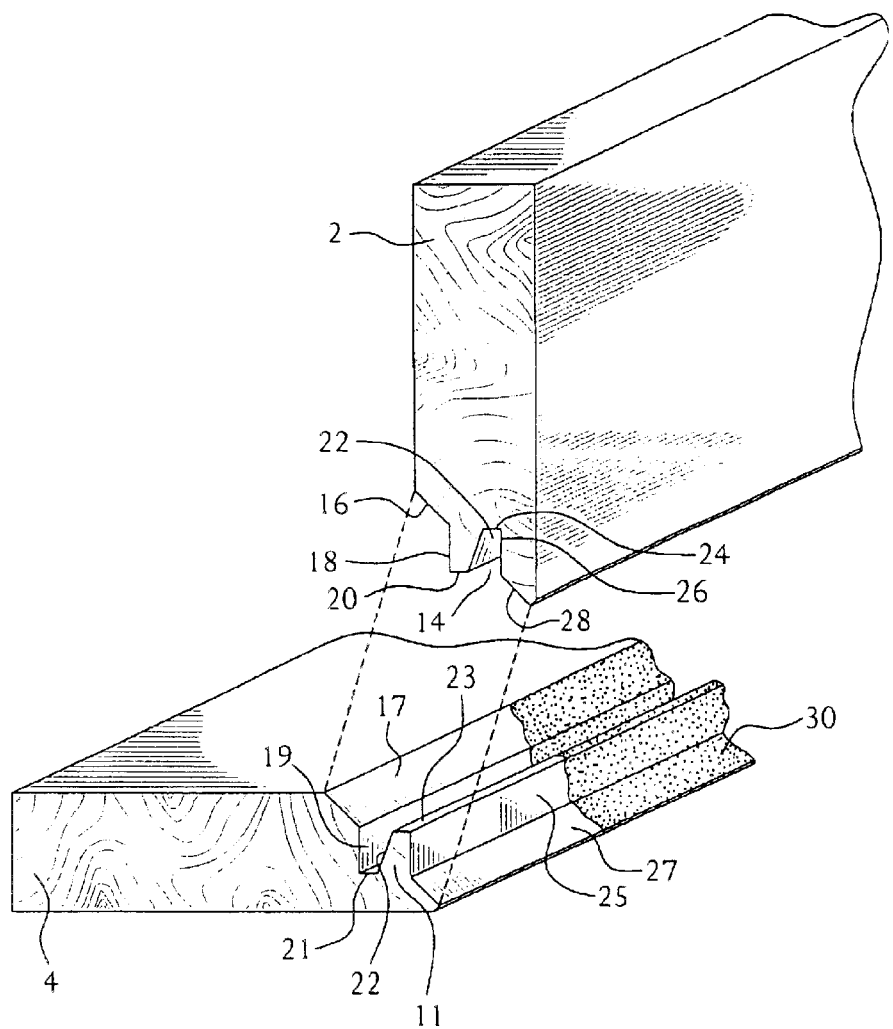
FIG. 3 is an exploded view of the components of the present invention.

Cornerboard 1, itself, comprises separate millwork component pieces 2 and 4. Each piece 2 and 4 has, at their respective ends, outwardly extending male members which are configured to interlock to form a joint. As shown in FIGS. 2 and 3, at end 8, piece 2 comprises outwardly extending male members 10 and 12, forming opening 14 therebetween. Planar outer surfaces 16, 18, 20, 22, 24, 26 and 28 are located on members 10 and 12 at end 8.

Also as shown in FIGS. 2 and 3, piece 4, at end 9, comprises outwardly extending male member 11. Member 11 is configured to be inserted into and located within opening 14 of piece 2. Planar outer surfaces 17, 19, 21, 23, 25, 27 and 29, located on member 11 at end 9 of piece 4, are configured to positioned on planar outer surfaces 16, 18, 20, 22, 24, 26 and 28, respectively, in surface to surface contact.

Placement of member 11 of piece 4 within opening 14 of piece 2, positions member 11 and members 10 and 12 in opposite directions, and the resulting surface to surface contact of the planar outer surfaces of the pieces forms an interlocking joint between the pieces.

An adhesive 30, such as epoxy, is normally applied to the planar outer surfaces, to provide a secure bond between pieces 2 and 4. The interlocking configuration of cornerboard 1, secured by adhesive, provides a strong and inseparable cornerboard joint.

The scope of invention is not restricted by the embodiment disclosed herein. While the cornerboard discussed teaches the use of dual extending male members 10 and 12 mating with a single oppositely extending male member 11, it is contemplated that different interlocking configurations may be used, e.g. three male members, joined with two opposing members, four members with three members, etc. Although planar surfaces are most advantageously employed and economically manufactured, the adjacent, mating components could comprise curved surfaces.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

What is claimed is:

1. A cornerboard comprising:
   (a) dual interlocking cornerboard components, the first of the dual components having a longitudinal length and a transverse width and comprising an end section consisting solely of two (outwardly extending) male members extending outwardly from the first dual component at an acute angle in relation to each other, the male members having planar outer surfaces forming a channel opening extending substantially the full longitudinal length of the first component, and the second of the dual components having a longitudinal length and a transverse width and comprising an end section consisting of a substantially trapezoidal shaped channel opening extending subsequently the full longitudinal length of the second component, one of the two male members extending substantially within the full length of the opening, the second component also having a single outwardly extending male member with planar outer surfaces, said single male member having planar outer surfaces extending substantially the full longitudinal length of the second component and being located and extending substantially within the full length of the opening of the first component, the planar outer surfaces of the components being positioned in surface to surface contact to fittingly interlock the first component in perpendicular relation with the second component to form a cornerboard joint.

2. The cornerboard as in claim 1 further comprising adhesive means to attach the planar outer surfaces of the first and second components.

3. A cornerboard comprising:
   (a) first and second interlocking cornerboard components, the first component having a longitudinal length and a transverse width and comprising an end section consisting solely of dual joint moans extending outwardly from the first component at an acute angle in relation to each other for connecting the first and second components in perpendicular relation to each other, each said joint means comprising planar outer surfaces, the dual joint means forming a channel opening which extends substantially the full longitudinal length of the first component, and the second component having a longitudinal length and a transverse width and comprising an end section consisting of a substantially trapezoidal shaped channel opening extending substantially the full longitudinal length of the second component, one of the dual joint means being located and extending substantially within the full length of the opening, the second component also having single joint means with planar outer surfaces, said single joint means extending in the opposite direction as the dual joint means of the first component and substantially the full longitudinal length of the second component and being located and extending substantially within the full length of the opening of the first component, whereby the planar outer surfaces of the joint means of each component are positioned in surface to surface contact to fittingly interlock the end sections of the cornerboard components in perpendicular relation to each other.

4. The cornerboard as in claim 3 further comprising adhesive means to attach the dual components.

* * * * *